United States Patent
Hui et al.

(10) Patent No.: US 10,777,164 B2
(45) Date of Patent: Sep. 15, 2020

(54) POWER OPTIMIZATION BY RENDERING LOW-RESOLUTION TILES DURING PAGE LOAD

(71) Applicant: Qualcomm Innovation Center, Inc., San Diego, CA (US)

(72) Inventors: Shiu Wai Hui, Richmond Hill (CA); Site Mao, San Diego, CA (US); Shyama Prasad Mondal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 14/973,512

(22) Filed: Dec. 17, 2015

(65) Prior Publication Data

US 2016/0180803 A1    Jun. 23, 2016

Related U.S. Application Data

(60) Provisional application No. 62/094,526, filed on Dec. 19, 2014.

(51) Int. Cl.
```
G09G 5/00      (2006.01)
G09G 5/391     (2006.01)
G06F 16/957    (2019.01)
G06F 40/14     (2020.01)
```
(Continued)

(52) U.S. Cl.
CPC ......... *G09G 5/005* (2013.01); *G06F 16/9577* (2019.01); *G06F 40/103* (2020.01); *G06F 40/14* (2020.01); *G09G 5/391* (2013.01); *G06T 2200/24* (2013.01); *G06T 2210/36* (2013.01); *G09G 5/34* (2013.01); *G09G 2330/021* (2013.01); *G09G 2340/04* (2013.01); *G09G 2360/08* (2013.01); *G09G 2360/122* (2013.01);
(Continued)

(58) Field of Classification Search
CPC .. G09G 5/005; G06F 17/3089; G06F 17/2247
See application file for complete search history.

(56) References Cited

U.S. PATENT DOCUMENTS 5,638,523 A * 6/1997 Mullet .................. G06F 3/0481
                                                      345/661
6,044,385 A * 3/2000 Gross ................ G06F 17/30716
                                                      345/427

(Continued)

*Primary Examiner* — Phenuel S Salomon
(74) *Attorney, Agent, or Firm* — Neugeboren O"Dowd PC

(57) ABSTRACT

A method for rendering content includes initiating a rasterization of a complete version of webpage content, the webpage content including a set of webpage elements, and setting an original tile pixel resolution of the set of webpage elements to be the same as a screen pixel resolution of a display on a content display device. The method includes rasterizing the set of webpage elements at a lower tile resolution onto a tile buffer, the lower tile pixel resolution differing from the original tile pixel resolution by a scaling factor. The method includes scaling up the set of webpage elements rasterized at the lower tile pixel resolution to the screen pixel resolution of the display. Finally, the method includes compositing the rasterized set of webpage elements onto a display during the rasterization of the complete version of the webpage content, and then compositing the complete version of the webpage content.

22 Claims, 6 Drawing Sheets

(51) Int. Cl.
  *G06F 40/103* (2020.01)
  *G09G 5/34* (2006.01)

(52) U.S. Cl.
  CPC ........ *G09G 2370/027* (2013.01); *Y02D 10/45* (2018.01)

(56) References Cited

U.S. PATENT DOCUMENTS

| | | | | |
|---|---|---|---|---|
| 7,047,294 B2* | 5/2006 | Johnson | | H04L 29/06 709/224 |
| 7,747,602 B2* | 6/2010 | Sampson | | G06F 16/958 707/708 |
| 8,384,726 B1* | 2/2013 | Grabowski | | G06T 15/20 345/539 |
| 8,593,666 B2* | 11/2013 | Xiao | | G06F 17/30905 358/1.15 |
| 8,689,117 B1* | 4/2014 | Vasilik | | G06F 16/9577 715/760 |
| 8,913,067 B1* | 12/2014 | Kokkevis | | G06F 9/4443 345/522 |
| 10,148,735 B1* | 12/2018 | Kolam | | G06F 16/9574 |
| 2002/0015042 A1* | 2/2002 | Robotham | | G06F 3/14 345/581 |
| 2002/0021308 A1* | 2/2002 | White | | G06F 3/0236 715/800 |
| 2003/0133752 A1* | 7/2003 | Theurer | | E01B 27/16 404/133.05 |
| 2003/0137522 A1* | 7/2003 | Kaasila | | G06F 17/30905 345/619 |
| 2005/0022128 A1* | 1/2005 | Nicholas | | G06F 17/212 715/731 |
| 2005/0046901 A1* | 3/2005 | Silverbrook | | B41J 2/16511 358/1.18 |
| 2005/0132286 A1* | 6/2005 | Rohrabaugh | | G06F 9/4443 715/239 |
| 2007/0047814 A1* | 3/2007 | Yamazaki | | H04N 1/4406 382/176 |
| 2007/0250768 A1* | 10/2007 | Funakami | | G06F 17/30905 715/210 |
| 2008/0030775 A1* | 2/2008 | Adachi | | H04M 3/4938 358/1.15 |
| 2008/0177994 A1* | 7/2008 | Mayer | | G06F 9/4418 713/2 |
| 2008/0306815 A1* | 12/2008 | Dykes | | G06Q 30/02 705/14.73 |
| 2010/0014103 A1* | 1/2010 | Lee | | G06K 15/02 358/1.9 |
| 2012/0066586 A1* | 3/2012 | Shemesh | | G06F 16/9574 715/235 |
| 2012/0151329 A1* | 6/2012 | Cordasco | | G06F 11/3006 715/234 |
| 2012/0254791 A1* | 10/2012 | Jackson | | G06F 3/04815 715/781 |
| 2012/0297292 A1* | 11/2012 | Dougherty | | G06F 17/2229 715/238 |
| 2013/0111330 A1* | 5/2013 | Staikos | | G06F 17/21 715/241 |
| 2013/0198641 A1* | 8/2013 | Brownlow | | G06F 3/0485 715/738 |
| 2013/0227391 A1* | 8/2013 | Lim | | G06F 16/9577 715/234 |
| 2013/0227396 A1* | 8/2013 | Chinnathambi | | G06F 17/212 715/235 |
| 2013/0262983 A1* | 10/2013 | Richter | | G06F 17/2247 715/234 |
| 2014/0108909 A1* | 4/2014 | Geelnard | | G06F 17/212 715/234 |
| 2016/0026611 A1* | 1/2016 | Liu | | G06F 17/218 715/234 |
| 2016/0246895 A1* | 8/2016 | Kolam | | G06F 16/9574 |
| 2017/0169124 A1* | 6/2017 | Reshadi | | G06F 21/64 |
| 2017/0235829 A1* | 8/2017 | Han | | G06F 17/2247 707/706 |

* cited by examiner

POWER OPTIMIZATION BY RENDERING LOW-RESOLUTION TILES DURING PAGE LOAD

CLAIM OF PRIORITY UNDER 35 U.S.C. § 119

The present application for patent claims priority to Provisional Application No. 62/094,526 entitled "POWER OPTIMIZATION BY RENDERING LOW-RESOLUTION TILES DURING PAGE LOAD" filed Dec. 19, 2014, and assigned to the assignee hereof and hereby expressly incorporated by reference herein.

FIELD OF THE DISCLOSURE

The present invention relates to content display devices. In particular, but not by way of limitation, the present invention relates to apparatus and methods for improving the performance of content rendering on content display devices.

BACKGROUND OF THE DISCLOSURE

Content display devices such as smartphones, netbooks, gaming devices, PDAs, desktop computers, televisions, and laptop computers are now ubiquitous. And these devices now very commonly include hardware that provides network connectivity to web servers and software (e.g., web browsers) that provide an interface for users to request and view content from these web servers.

When a web page is being loaded by a web browser, due to the potentially long time it takes to obtain and process all the data from the Internet, the browser often displays an incomplete version of the page with content that is already loaded and processed while the rest of the page is being loaded. By displaying an incomplete version, the user can start reading part of the page instead of seeing a blank screen. Users have become accustomed to being able to view at least some content on a page as quickly as possible, and therefore, current web browsers and content display devices together often utilize a significant amount of processing power to display that content. Very often, these incomplete versions of the web page are displayed for only a short period of time. Yet they are still computationally expensive (and use a lot of power) to render.

The rendering process includes 1) determining the layout of the page by parsing style sheets (e.g., CSS); 2) converting the laid out HTML elements into graphics elements; 3) rasterizing graphics elements into bitmaps using a graphics library; and 4) compositing the bitmaps onto the screen. These steps are done for each incomplete version of the page during a page load, as well as for the final completely loaded version of the page. This involves significant processing and increased power usage in comparison to rendering just one version of the webpage.

SUMMARY

One aspect of the present disclosure provides a method for rendering content on a content display device. The method may include may include, initiating a rasterization of a complete version of webpage content, the webpage content including a set of webpage elements. Then, the method may include setting an original tile pixel resolution of the set of webpage elements to be the same as a screen pixel resolution of a display on the content display device. Next the method may include rasterizing the set of webpage elements at a lower tile resolution onto a tile buffer, the lower tile pixel resolution differing from the original tile pixel resolution by a scaling factor. Further, the method may include scaling up the set of webpage elements rasterized at the lower tile pixel resolution to the screen pixel resolution of the display. Finally, the method may include compositing the rasterized set of webpage elements onto a display during the rasterization of the complete version of the webpage content, and then compositing the complete version of the webpage content.

Another aspect of the present disclosure provides a content display device for rendering webpage content, which may comprise a user interface widget configured to initiate a rasterization of a complete version of the webpage content, the webpage content including a set of webpage elements. The device may further comprise a graphics processing unit configured to set an original tile pixel resolution of the set of webpage elements to be the same as a screen pixel resolution of a display on the content display device. The device may also comprise a rasterizer configured to rasterize the set of webpage elements at a lower tile pixel resolution onto a tile buffer. Additionally, the content display device may comprise a scale down component configured to scale down the original tile pixel resolution to the lower tile pixel resolution, as well as a scale up component configured to scale up the set of webpage elements rasterized at the lower tile pixel resolution to the screen pixel resolution of the display. Finally, the device may include a compositor configured to composite the rasterized set of webpage elements onto the display during the rasterization of the complete version of the webpage content, and composite the complete version of the webpage content.

Yet another aspect of the present disclosure provides a non-transitory, tangible computer readable storage medium, encoded with processor readable instructions to perform a method for rendering webpage content on a content display device, the method comprising initiating a rasterization of a complete version of webpage content, the webpage content including a set of webpage elements. Then, the method may include setting an original tile pixel resolution of the set of webpage elements to be the same as a screen pixel resolution of a display on the content display device. Next the method may include rasterizing the set of webpage elements at a lower tile resolution onto a tile buffer, the lower tile pixel resolution differing from the original tile pixel resolution by a scaling factor. Further, the method may include scaling up the set of webpage elements rasterized at the lower tile pixel resolution to the screen pixel resolution of the display. Finally, the method may include compositing the rasterized set of webpage elements onto a display during the rasterization of the complete version of the webpage content, and then compositing the complete version of the webpage content.

DETAILED DESCRIPTION

Modern web browsers are often executed on content display devices by chipsets containing at least a central processing unit and a graphics processing unit. These web browsers may utilize a component known as WebView, which may be thought of as user interface (UI) widget within a browser that specifically functions to render and ultimately display web content. A WebView widget, in some instances, may be used to render and display web content within a full web browser application. It may also be used to render and display web content within another application, and provide dynamic functionality (such as functions implemented by JavaScript) rather than to perform other browser functions (such as navigating or searching) with that application. Often, a WebView widget is what is used in applications to display web content without exiting the application and opening a dedicated web browser application. For example, a social media application on a smartphone may contain a link to a website, and if a user clicks on it, a WebView may be used to display the website's content without opening a new browser window. Throughout this disclosure, reference will be made to WebView, which is the most common name for a UI widget that functions as described herein across many modern web browsers. However, this disclosure may also apply to comparable UI widgets within browsers that may have different names. In certain web browsers that utilize WebView, the WebView UI widget is comprised of two separate WebView subcomponents. These "dual WebView" configurations allow one of the WebViews to render a first, simpler version of the web content for faster loading and display while the other WebView renders a complete version of the web content in the background. For the purposes of the present disclosure, the two kinds of WebViews may be referred to as "Fast WebView" and "Full WebView."

Figure 1:
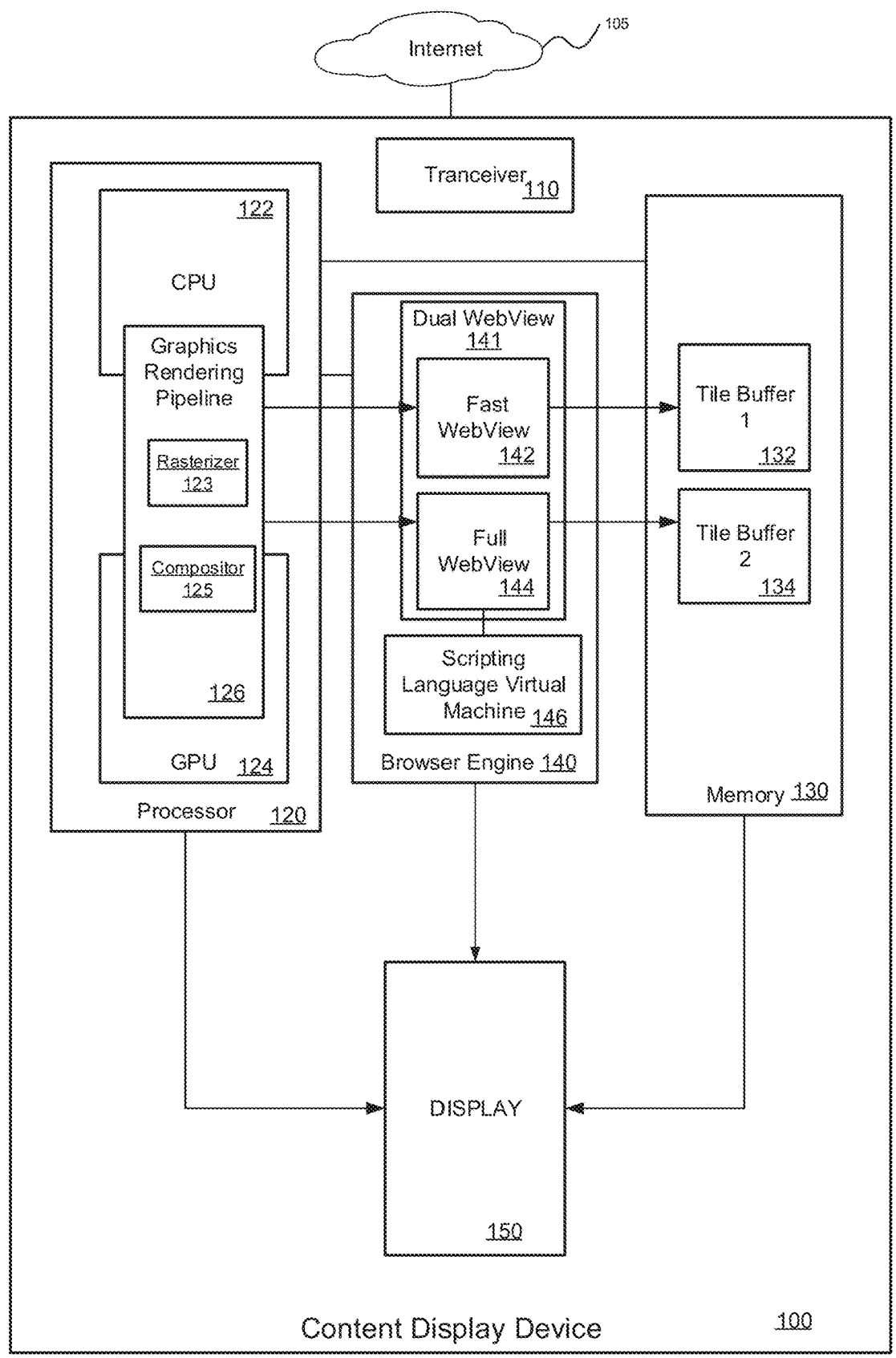
FIG. 1 is a logical block diagram of a content display device that may implement aspects of the present disclosure.

FIG. 1 is a logical block diagram of a content display device 100 that may implement aspects of the present disclosure. FIG. 1 is not intended to be a hardware diagram, and the logical blocks depicted may be implemented in hardware alone, a combination of hardware and software, or software alone. Though the various blocks are shown as separate components, such separation is for the purposes of illustration only, and components may be indistinguishable in implementation. As shown, the content display device 100 has a transceiver 110 through which to request and receive web content from the internet 105. The content display device 100 also has a processor 120 (also known as a chipset), which may itself comprise a central processing unit (CPU) 122 and a graphics processing unit (GPU) 124. The CPU 122 and the GPU 124 together may implement a graphics rendering pipeline 126, which may perform a series of functions that generally include rasterizing and compositing, carried out by the rasterizer 123 and the compositor 125. The graphics rendering pipeline may include many additional functions that are known in the art, but which are omitted here for brevity. The processor 120 and the subcomponents thereof may utilize access a memory 130 in order to implement the various functions of the graphics rendering pipeline 126.

When web content is received by the transceiver 110, the processor 120 may execute a browser engine 140. Though the browser engine 140 is shown as a separate logical component connected to the processor 120 and the memory 130, this depiction is only for the purposes of illustrating that the browser engine 140 is executed by elements of the processor 120, including the CPU 122, the GPU 124, and the graphics rendering pipeline 126, and that the browser engine 140 utilizes physical space in the memory 130. As previously discussed, the browser engine 140 includes a dual WebView widget 141 comprising a Fast WebView 142 and a Full WebView 144. The browser engine 140 also includes a scripting language virtual machine 146, which may be implemented by, for example, a JavaScript virtual machine. As will be discussed later in this disclosure, the Fast WebView 142 may be able to display HTML and CSS elements, as well as image and video files, but its capability to execute scripting language elements may be disabled. In contrast, the Full WebView 144 may display all HTML and CSS elements and image and video files, but may also execute scripting language elements. Therefore, the scripting language virtual machine 146 is depicted as logically connected to the Full WebView 144 but not to the Fast WebView 142. Various other components of the browser engine 140 are omitted here for clarity, but a browser engine 140 may be implemented by a variety of browser engines known in the art, such as a WebKit engine. The Fast Webview 142 and Full WebView 144 may utilize tile buffers in the memory 130 for the rasterization of content. As depicted, the Fast WebView utilizes a first tile buffer and the Full WebView utilizes a second tile buffer. Finally, the content display device 100 includes a display 150 upon which content from the dual WebView widget 141 is ultimately drawn and visible to a user.

Throughout this disclosure, several terms may be used to describe aspects of the rendering process as executed by the graphics rendering pipeline 126, the browser engine 140, and the memory 130. As used herein, the phases of rendering may be divided into rasterization, which broadly refers to the processing of content onto a buffer, and compositing, which broadly refers to the displaying of rasterized content onto the pixels of the display. Additional terms in may be used in the art to describe more specific aspects of rasterizing and/or compositing (e.g., "painting" "drawing," "shading," etc.) but for clarity in the present disclosure, rasterizing and compositing will be used to describe the processes as stated above.

The dual WebView browser configuration operates to improve a performance metric known as time-to-first-pixel (TTFP). TTFP is a measure of how much time elapses between when a user clicks on web content and when some of that content is composited onto a screen pixel on a display. A number of factors influence TTFP, including the speed at which content is downloaded from the internet, the complexity of rendered content, and the screen image resolution. Regarding the relationship between TTFP and the complexity of rendered content, typically, the more complex the content (i.e., the more complex the draw commands are), the longer the TTFP. When a browser receives content from an webpage, it parses the HTML and CSS, and builds a document object model (DOM) tree, a render tree, and a layer tree, which establish what the various objects on a page are and where they are to be rendered in relation to each other. It is understood in the art that DOM trees, render trees, and layer trees are interdependent and establish different types of relationships between objects on a page. Based on these steps, the browser knows which web page elements are simple to draw and which ones are more complex. A typical web page may have more than 150 objects to render, which may include one or more backgrounds, scripting-language objects (e.g., JavaScript), HTML objects, CSS objects, JPEGs, PNGs, and video objects.

Typically, draw commands for solid colors, backgrounds, and text are considered simple to render, while image files such as .jpg, .png, .tiff, or animations such as .gif, or video files, are somewhat more complex, and scripting language content is even more complex. Image and video files may not always be very complex to render, but may be take longer to render if the file is large and/or slow to download. Therefore, the TTFP for simple draw commands, such as background colors and text, may be significantly shorter than the TTFP for images or video. Dynamic scripting language content, such as JavaScript, can often be the most complex element to render. This complexity may be due to the fact that the scripting language code may be lengthy and therefore take a while to load, that a scripting language virtual machine is required to implement it, and that additional content may be retrieved from the internet to implement the scripting language code. As a result, scripting language elements may have a very slow TTFP. In some cases, scripting language elements may not even be visible to a user until or unless the user starts interacting with a page. A common example of JavaScript that is used when a user interacts with a webpage are the auto-complete options that appear when a user enters search terms in a search engine toolbar. Presenting a user with the elements of a webpage that have the fastest TTFP can be useful. For example, if a user loads a news article, and the background and text are presented quickly, the user may begin reading right away, and during the few seconds that it takes for the more complex content to be rendered, the user will at least have some beneficial use of the screen.

Figure 2:
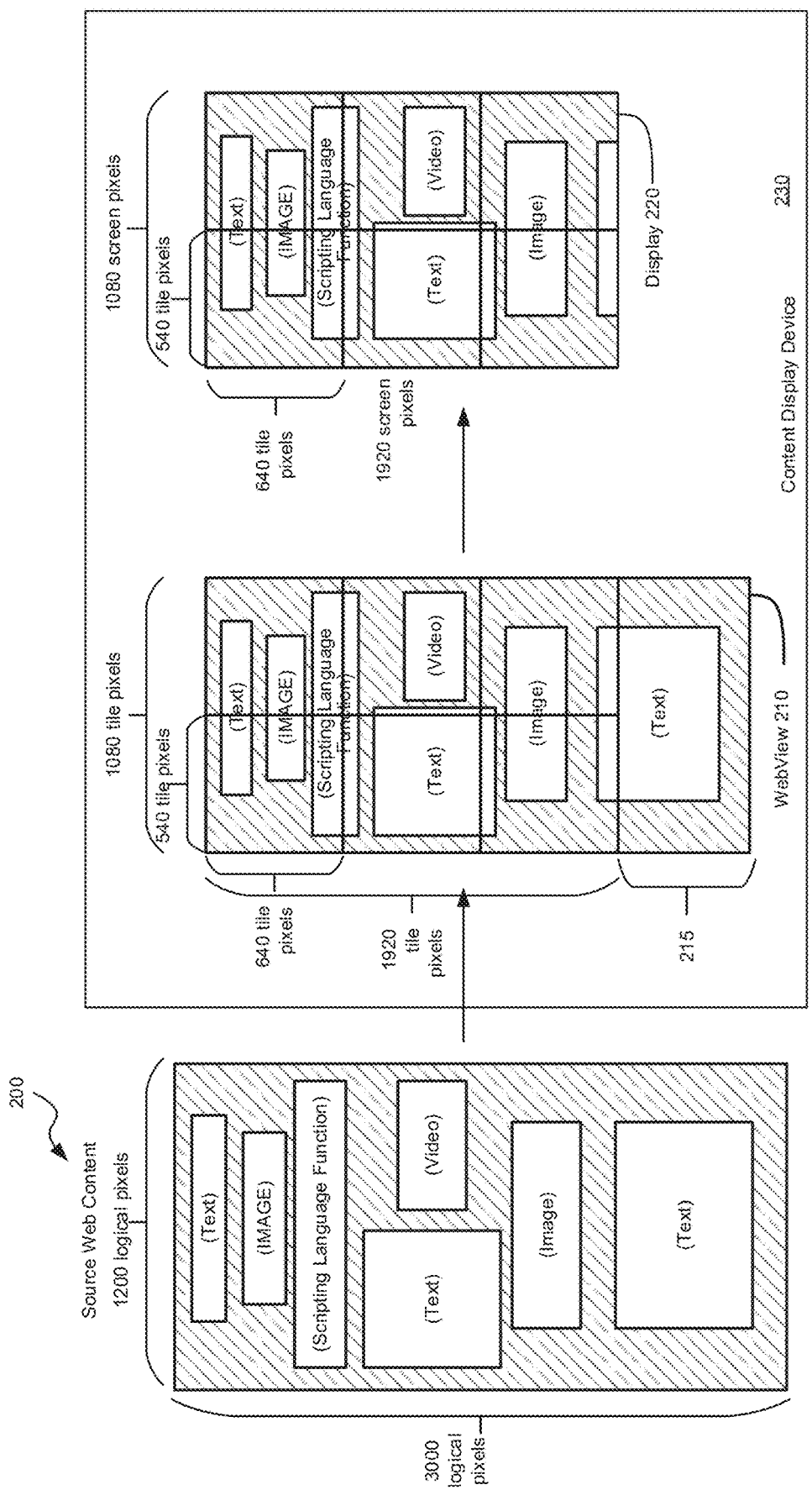
FIG. 2 is a diagram of the various types of pixels that comprise web content in different contexts.

Regarding the relationship between resolution and TTFP, generally, the higher the resolution of any rendered content, whether it is a solid color, text, image, or any other content, the longer the TTFP will be. This is due to the fact that each pixel must be rasterized in some manner, and rasterization requires processing resources. Resolution is generally defined as a measure of how many pixels are used to display an image; when more pixels are used, the image has higher resolution. Typically, the resolution of any given image displayed on a pixelated display is equal to the number of pixels on the display. In the present disclosure, the terms "resolution" and "pixels" may refer to pixels in more than one context. FIG. 2 illustrates the relationship between "logical pixels," "tile pixels," and "screen pixels," which will be referenced throughout this disclosure. Most modern web content is delivered in files, objects, commands, or other content that will automatically be rendered using the full screen pixel resolution available on a given content display device. This is because the resolution and layout of web content is described in HTML using logical pixel values to specify the relationship of various objects to each other, and those logical pixel values get scaled to the actual screen pixel resolution on a particular device as part of the rendering process. For example, as shown in FIG. 2, a webpage 200 that is hosted on the internet may have logical pixel values that specify it is 1200 pixels wide by 3000 pixels long. Whether the display of the device is 1334×750 pixels, or 1920×1080 pixels, or 1440×2560, content from the same 1200×3000 webpage 200 will typically be adjusted by each device such that each of the pixels will be used on each display, and the displays with the highest number of pixels will have the highest screen pixel resolution.

FIG. 2 shows a content display device 230 on the right with two depictions of the webpage 200 rendered, one in a WebView 210 showing the content divided into tiles, and one in a screen display 220 that has a resolution of 1080×1920 screen pixels. The resolution of the WebView 210 may be described in terms of "tile pixels," as will be discussed presently.

In many content display devices, when web content is downloaded, it is divided into a plurality of tiles (also known as quads, because they are rectangular in shape) for rendering. There are a number of benefits to partitioning web content from a web page into tiles, many of which pertain to conserving processing resources. Typically, the number of tiles that a web page is partitioned into is proportionally related to the screen size available on the particular device. As shown in FIG. 2, if the smartphone screen display 220 is 1080×1920 pixels, which can be easily divided into six tiles that are each 540×640, then the content that would fill the screen may be divided into six tiles for rasterization and then compositing. When tiles are rasterized (e.g., in a WebView), they may be rasterized onto a physical tile buffer space in memory using a number of tile pixels that corresponds one-to-one with the number of screen pixels associated with each tile. That is, if a screen tile has 540×640 pixels, then the corresponding tile buffer will have 540×640 tile pixels rasterized onto it. Therefore, the WebView 210 is shown with six tiles that take up the 1080×1920 space, and some additional web content 215 below. The additional web content 215 may or may not be divided up unto tiles and rasterized, and sits outside of the visible area of the actual display. The once the tiles are rasterized in the WebView 210, they may be composited onto the display at the corresponding screen pixel locations. As shown, the six tiles and their tile pixels in the WebView 210 correspond one-to-one to the six tiles and their screen pixels in the display 220.

Figure 3:
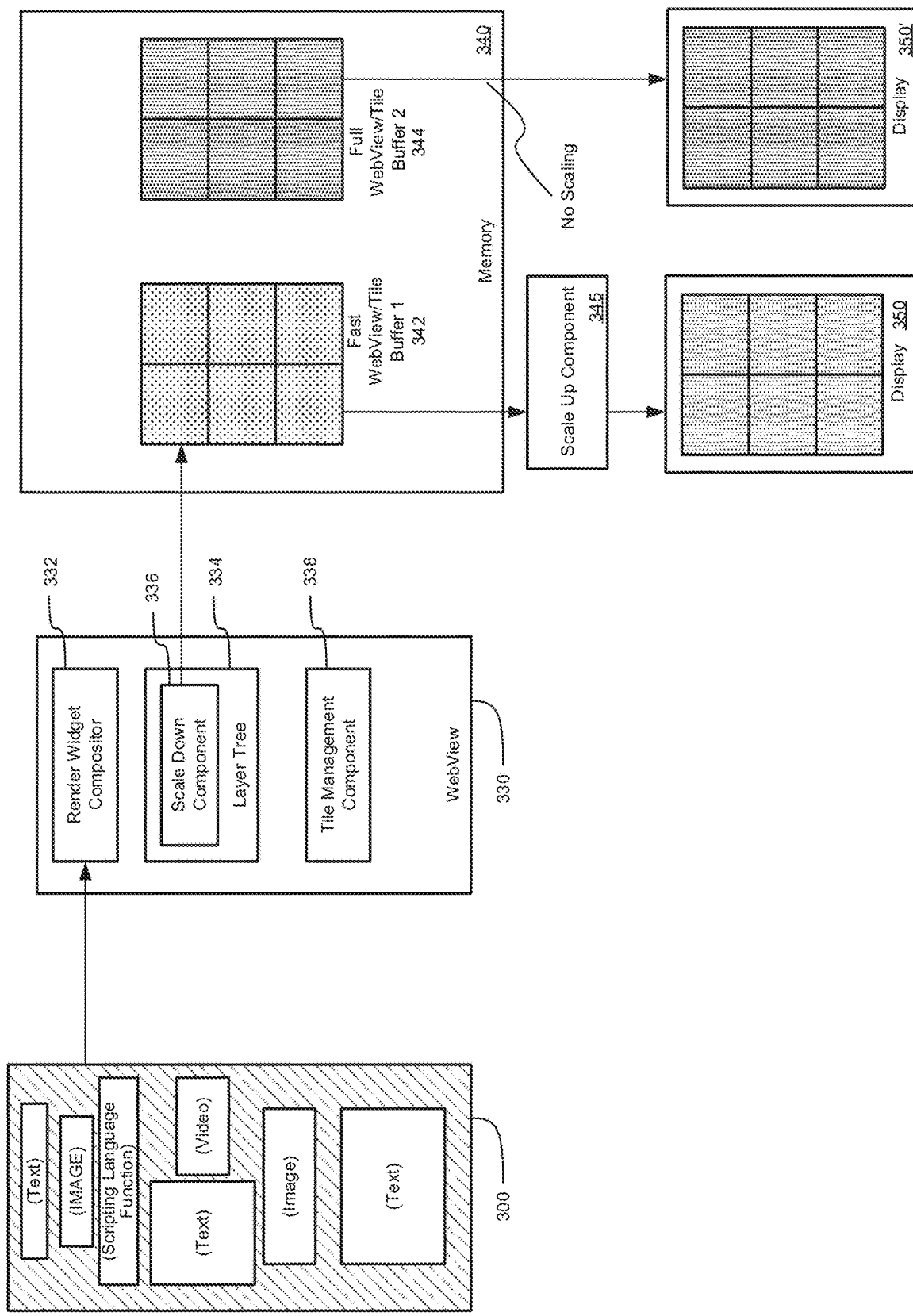
FIG. 3 illustrates how web content may be rendered using a WebView user interface widget according to aspects of the present disclosure.

One aspect of the present disclosure is that the tile pixels in a Fast WebView may be scaled to a lower resolution than would be normally used to rasterize content onto tiles in order to conserve processing resources. FIG. 3 illustrates an implementation of this scaling of the tile pixels. The logical components shown in FIG. 3 may correspond to similar logical components of the content display device 100 in FIG. 1, but with particular aspects omitted for clarity and other aspects added for specificity. The WebView component 330 corresponds to the dual WebView component 141 of FIG. 1. As shown in FIG. 3, the WebView component 330 comprises additional subcomponents including a render widget compositor 332, a layer tree 334, and a tile management component 338. The layer tree further comprises a scale down component 336.

As shown, webpage content 300 from the Internet is received by the WebView user interface widget 330 on the content display device. The webpage content 330 may contain various simple webpage elements, complex webpage elements, and scripting language elements as discussed throughout this disclosure. In operation, the Web View 330 renders the content with no scripting language processing (e.g., without JavaScript processing) on the Fast WebView (on the first tile buffer) 342 and at the same time the processing of the Full WebView (on the second tile buffer) 344 is initiated with the scripting language processing using a scripting virtual machine (e.g., JavaScript virtual machine) in the background. An aspect of the present disclosure is that before the WebView 330 begins rasterizing the content onto either the Fast WebView 342 or the Full WebView 344, the render widget compositor 332 checks which version is about to be rasterized, which is represented by the render widget compositor 332 receiving information from the webpage content 300 via an arrow. When it is the Fast WebView portion that is to be rasterized, the render widget compositor 332 passes instructions to the layer tree 334 to scale the amount of tile pixels to be rasterized down. The scale down component 336 may apply a particular scaling factor to the tile pixels such that only a percentage of the tile pixels that would normally be rasterized are actually rasterized. For example, a scaling factor of 75% may be used. It is contemplated that other scaling factors that are slightly higher or lower may be used. The smaller the scaling factor, the fewer tile pixels would be rasterized, and the more processing resources could be conserved. However, scaling factors at or near 75% (e.g., between 70%-80%) are advantageous because from experiments, it has been found that a user cannot differentiate between 75% and 100% resolution visually, or in other words, the content is not aesthetically unpleasing. Because this limited, temporary version of the webpage content will eventually be replaced, reducing the resolution doesn't compromise the user's experience. And this approach may actually improve the user's experience because a faster time-to-first-pixel will be realized by virtue of the low-resolution content being rendered sooner in the Fast WebView.

Figure 4:
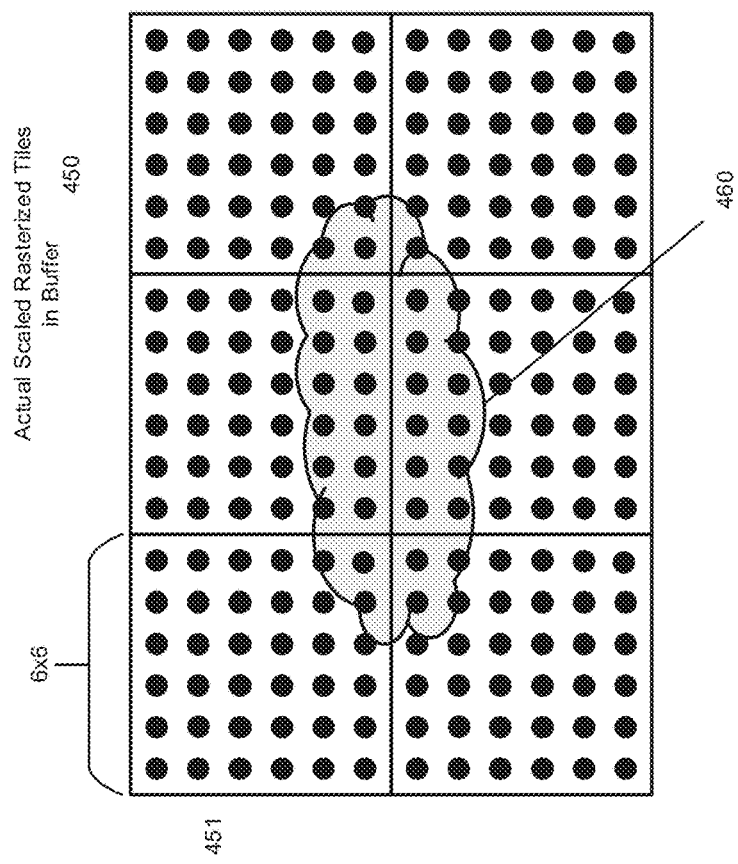
FIG. 4 illustrates how tile pixel resolution may be reduced according to aspects of the present disclosure.
Figure 4:
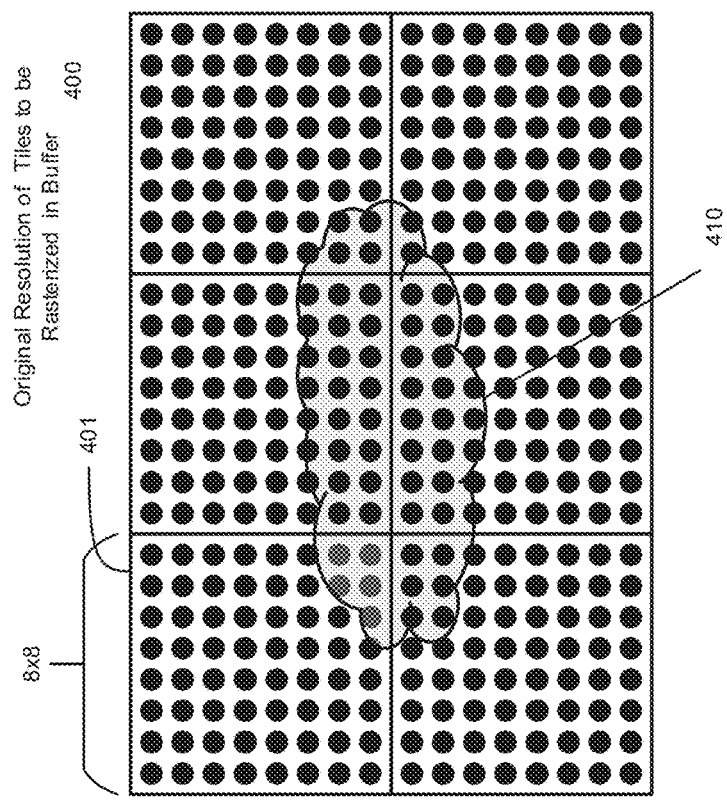

Referring now to FIG. 4, it illustrates the concept of reducing the resolution of tiles by scaling the number of pixels to be rasterized by a factor of 75% in an enlarged view. As shown, a first set of tiles 400 on the left is depicted and represents tile pixels as they would be rasterized at a full resolution. In FIG. 4, the first set of tiles 400 are depicted as being 8×8 pixels large (rather than at 540×640, for simplicity). The scaled tiles 450, on the right, are only 6×6 pixels large (i.e., 75% of the 8×8 first set of tiles 400), but they are the same tile size as the first set of tiles. As shown, the upper left 8×8 tile 401 of the first set of tiles 400 is the same "size" as the upper left 6×6 tile 451 of the scaled tiles 450. This similarity in size between an 8×8 tile and a 6×6 tile represents that both tiles are to be composited to the same screen pixel tile. In other words, the 8×8 tile 400 would be composited to an 8×8 screen pixel area, and the 6×6 tile would also be composited to an 8×8 screen pixel area. A benefit to making the upper left tile 401 of the first set of tiles 400 the same on-screen size as the upper left tile 451 of the scaled tiles 450 is that the same web page elements are rasterized in both tiles 401 and 451 (though the same elements in tile 451 are rasterized at a lower resolution. By doing this, generating all of the tiles in the Fast WebView will not involve rasterizing any more webpage elements than are rasterized in the Full WebView. In FIG. 4, a high resolution image 410 is superimposed on the first set of tiles 401, and a similar low resolution image 460 is superimposed on the second set of tiles 450, in order to illustrate that fewer pixels are used to render the same image in the second set of tiles 450. The process of compositing fewer tile pixels (e.g., 6×6) to a larger number of screen pixels (e.g., 8×8), may be referred to as "scaling up," which occurs when components of the graphics rendering pipeline apply transformations to tile information in order to shade each individual screen pixel. This process is similar to the scaling up that occurs whenever a lower resolution of pixels is composited onto a display of higher resolution. For example, if a .jpg file contained only 100×100 pixels of data, and it were to be displayed on an screen pixel area that was 300×300, then about three pixels would be shaded for each one of the file's pixels, resulting in a more blurry display than if the 100×100 pixels were to be displayed on an screen pixel area that was also 100×100 pixels. Similarly, the scaled 6×6 tiles 450 in will be scaled up to be composited onto an 8×8 screen pixel area, which means that the equivalent of approximately 1.33 screen pixels will be used to display each tile pixel that is rasterized. This will result in a slightly blurrier display than if the tile-pixel-to-screen-pixel ratio were one-to-one.

Referring back to FIG. 3, the scaling component 336 scales the tiles in the Fast WebView 342 but not the Full WebView 344. As shown, the tile pixel resolution of the Fast WebView 342 is lower than the tile pixel resolution of the Full WebView 344. As previously discussed, the set of webpage objects rendered in the Fast WebView 342 may include backgrounds, solid colors, text, images, video, and other HTML and CSS objects, but do not include scripting language objects. The content that is rasterized onto the Fast WebView 342 is essentially version of the webpage that comprises an incomplete set of webpage objects. This set of webpage objects that was first scaled down to be rasterized is then scaled up via a scale up component 345 in order to be composited onto the display 350 (at a first point in time) as soon as it is fully rasterized. The scale up component 345 may be separate component implemented in a portion of the graphics rendering pipeline outside of the WebView 330, or alternatively, the scale up component 345 may be a part of the WebView 330. The scale down component 336 and the scale up component 345 may therefore be completely separate, or related to each other, or part of the same component.

Once the content on the Fast WebView 342 and scaled up, it may be composited onto the display 350. This composition may be accomplished by a compositor component (e.g., the render widget compositor 332) Then, when the complete version of webpage content that is rasterized onto the Full WebView 344 (at full resolution, with scripting language content) is ready, it will be composited onto the same display 350' (at a second point in time). As shown, the screen pixel resolution in the display 350 is the same as the screen pixel resolution in the display 350', but is depicted as lighter to reflect that it has been scaled up from a lower resolution of tile pixels. By reducing the resolution of the tiles rasterized in the Fast WebView 342, processing power for rasterization is conserved, the TTFP of the content is improved, and the user's visual experience is not diminished.

Another aspect of the disclosure allows processing resources to be further conserved by prioritizing the rasterization of tiles that are in the viewport of the display (i.e., only the tiles that will be immediately visible on the display without scrolling). As shown in FIG. 3, the Webview 330 comprises a tile management component 338, through which a tile rendering policy may also be adjusted so that for the Fast WebView 342, only the tiles corresponding to the visible area in the viewport will be rasterized by default. This tile rendering policy differs from prior approaches, which would render additional tiles of content below the viewport. Referring back to FIG. 2, the WebView 210 tiles are shown as divided into six tiles, which correspond to the six tiles that are visible on the display 220. However, the WebView 210 also shows an area under the six tiles, which lies outside of the area of the display that is initially viewable, with additional web content 215 that could potentially be rasterized onto additional tiles. In embodiments of the present disclosure, this additional web content 215 is not rasterized in the Fast WebView at all, unless a user starts scrolling. In prior approaches, this additional web content that lies outside of the initial display area is set to be rasterized by default, in order to improve performance time if a user does scroll. Often, though, users do not scroll while the content is initially rendered by the Fast WebView, so rendering the additional web content 215 is often a waste of processing resources. Therefore, an aspect of the present disclosure is to change the default setting (by changing the tile rendering policy) of rasterizing additional webpage content 215 in the Fast WebView. The additional web content 215 may still be rendered in the Full WebView. With these two improvements of reducing the resolution of rasterized tiles in Fast WebView and changing the tile rendering policy of tiles in Fast WebView, noticeable power is saved, memory usage is reduced, and performance is improved, while having a minimal, if any, effect on user experience.

The content display device 100 may be realized by a variety of devices such as smartphones, netbooks, gaming devices, PDAs, desktop computers, televisions, tablets, and laptop computers, and the application 102 may be any of a variety of applications that a user interacts with to request, retrieve and view content such as a web browser, or any of a variety of other applications that utilize content (e.g., gaming, utility, and educational apps).

In general, power and memory consumption are reduced, and page load performance is improved. These improvements are typically more visible in high-resolution devices, and when the user visits new websites one by one.

Figure 5:
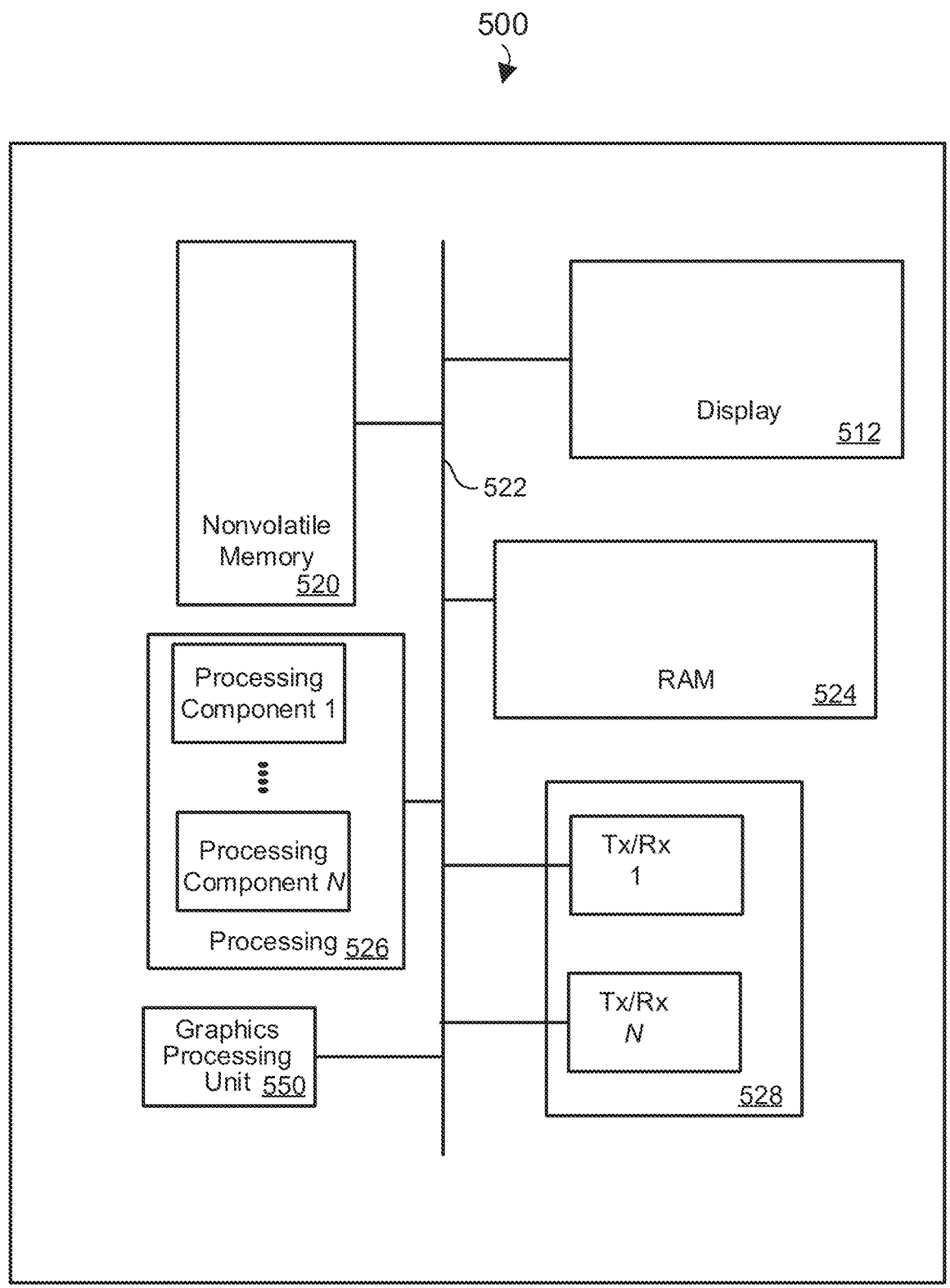
FIG. 5 is a logical block diagram of a content display device that may implement aspects of the present disclosure.

Referring next to FIG. 5, shown is a block diagram depicting physical components of an exemplary content display device 500 that may be utilized to realize the content display devices 100 described with reference to FIG. 1. As shown, the content display device 500 in this embodiment includes a display portion 512, and nonvolatile memory 520 that are coupled to a bus 522 that is also coupled to random access memory ("RAM") 524, a processing portion (which includes N processing components) 526, a transceiver component 528 that includes N transceivers, and a graphics processing component 550. Although the components depicted in FIG. 5 represent physical components, FIG. 5 is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 5.

This display portion 512 generally operates to provide a presentation of content to a user, and in several implementations, the display is realized by an LCD or OLED display. In general, the nonvolatile memory 520 functions to store (e.g., persistently store) data and executable code including code that is associated with the functional components depicted in FIG. 1. In some embodiments for example, the nonvolatile memory 520 includes bootloader code, modem software, operating system code, file system code, and code to facilitate the implementation of one or more portions of dual WebView component discussed in connection with FIG. 1 and other web browser components.

In many implementations, the nonvolatile memory 520 is realized by flash memory (e.g., NAND or ONENAND™ memory), but it is certainly contemplated that other memory types may be utilized as well. Although it may be possible to execute the code from the nonvolatile memory 520, the executable code in the nonvolatile memory 520 is typically loaded into RAM 524 and executed by one or more of the N processing components in the processing portion 526.

The N processing components in connection with RAM 524 generally operate to execute the instructions stored in nonvolatile memory 520 to effectuate the functional components depicted in FIG. 1. As one of ordinarily skill in the art will appreciate, the processing portion 526 may include a video processor, modem processor, DSP, and other processing components.

The depicted transceiver component 528 includes N transceiver chains, which may be used for communicating with external devices via wireless networks. Each of the N transceiver chains may represent a transceiver associated with a particular communication scheme.

Figure 6:
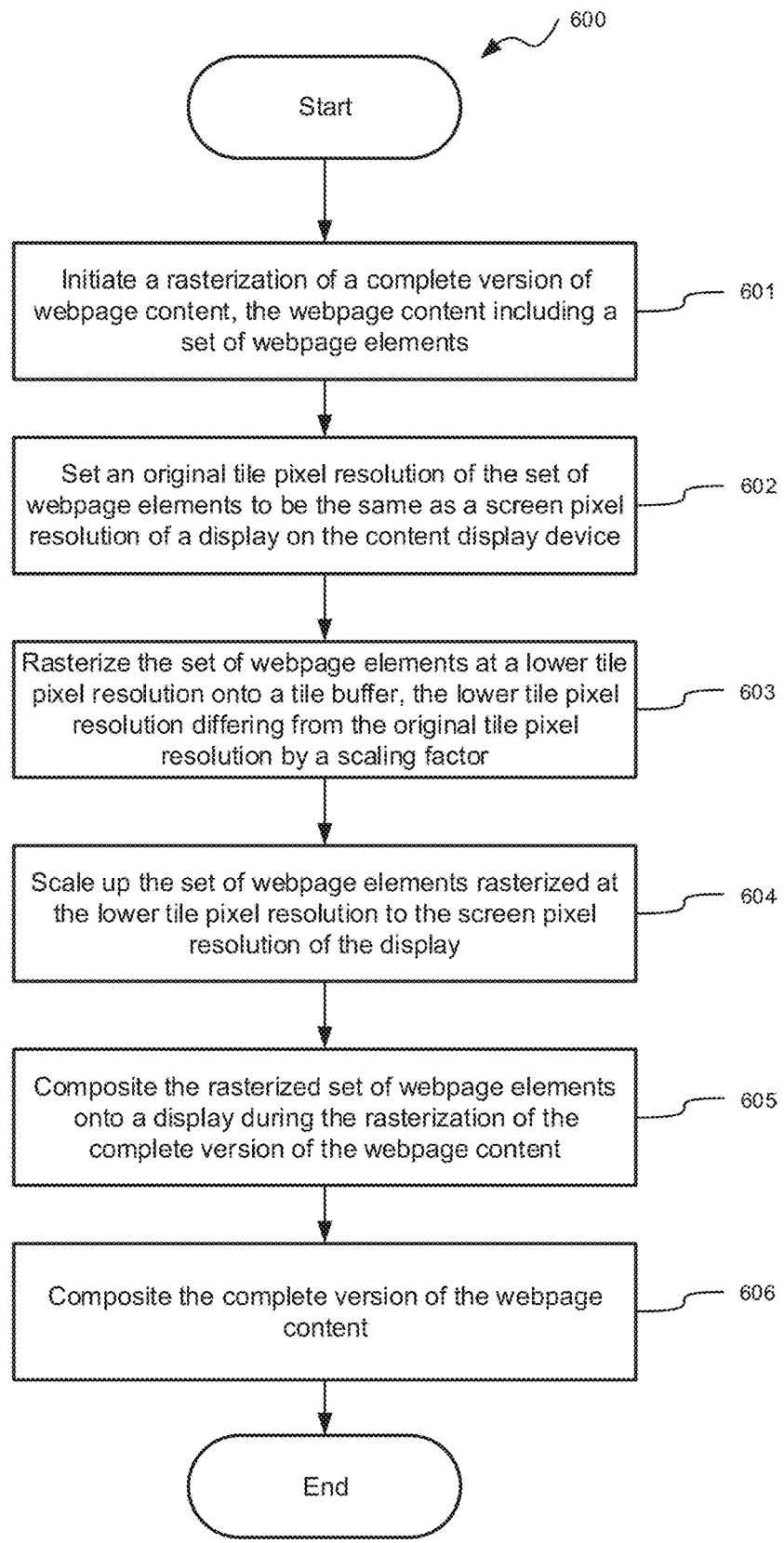
FIG. 6 is a flowchart that may be traversed to implement a method for rendering content according to the present disclosure.

FIG. 6 is a flowchart which may be traversed to perform a method 600 for rendering web content according to aspects of the present disclosure. The steps of the method may be described with reference to components in other figures that may be used to implement the steps. First, the method 600 may include, at block 601, initiating a rasterization of a complete version of webpage content, the webpage content including a set of webpage elements. This initiation may be implemented by, for example, a user interface widget such as the WebView 330. Then, at block 602, the method may include setting an original tile pixel resolution of the set of webpage elements to be the same as a screen pixel resolution of a display on the content display device, which may be accomplished by the graphics processing unit 124. Next, at block 603, the method may include rasterizing (e.g., by the rasterizer 123) the set of webpage elements at a lower tile resolution onto a tile buffer, the lower tile pixel resolution differing from the original tile pixel resolution by a scaling factor. Then, at block 604, the method may include scaling up (e.g., by the scale up component 345), the set of webpage elements rasterized at the lower tile pixel resolution to the screen pixel resolution of the display. Next, the method may include compositing (e.g., by the compositor 125) the rasterized set of webpage elements onto a display during the rasterization of the complete version of the webpage content, and then at block 605, compositing the complete version of the webpage content.

In conclusion, embodiments of the present invention improve the display of content (e.g., in terms of speed and/or performance) and/or reduce power consumption by reducing rendering calculations that would normally be carried out. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for rendering webpage content on a content display device, the method comprising:

initiating a rasterization, with a user interface widget of the content display device, of a complete version of the webpage content on a first tile buffer;

identifying, with a render widget compositor of the content display device, a limited set of webpage elements for rendering on the content display device as a limited, temporary version of the webpage content, to display while the complete version of the webpage content is being rasterized;

setting, with a graphics processing unit of the content display device, an original tile pixel resolution of the limited set of webpage elements to be the same as a screen pixel resolution of a display on the content display device;

scaling down, with a scale down component of the content display device, the original tile pixel resolution of the limited set of webpage elements to a lower tile pixel resolution by a scaling factor;

rasterizing, with the rasterizer of the content display device, the limited set of webpage elements at the lower tile pixel resolution onto a second tile buffer to generate a rasterized version of the limited set of webpage elements, wherein the first tile buffer is different than the second tile buffer;

scaling up, with a scale up component of the content display device, the rasterized version of the limited set of webpage elements to generate a scaled-up-rasterized-version of the limited set of webpage elements;

compositing as the temporary version of the webpage content, with a compositor of the content display device before the rasterization of the complete version has finished, the scaled-up-rasterized-version of the limited set of webpage elements onto an entire viewable area of the display while the rasterization of the complete version of the webpage content is occurring;

waiting to composite, with the compositor of the content display device, the complete version of the webpage content onto the display until after rasterization of the complete version has finished; and displaying, after the rasterization of the complete version has finished, the complete version of the webpage content on the entire viewable area of the display to replace the temporary version of the webpage content.

2. The method of claim 1, wherein the limited set of webpage elements further excludes other particular webpage elements that have a higher resolution compared to other particular webpage elements that have a lower resolution.

3. The method of claim 1, wherein the limited set of webpage elements and the complete version of the webpage content are rasterized and composited using a dual WebView user interface widget.

4. The method of claim 1, wherein the scaling factor is applied to the original tile pixel resolution using information from a layer tree.

5. The method of claim 1, wherein the scaling factor is between 70 and 80 percent.

6. The method of claim 1, wherein the scaled-up-rasterized-version of the limited set of webpage elements represents all of the webpage content that is viewable at once in the display, and wherein a default setting instructs a rasterizer to rasterize additional webpage content that lies outside of an area that is initially viewable in the display, and further comprising;

changing the setting such that the rasterizer does not rasterize the additional webpage content.

7. A content display device for rendering webpage content, comprising:
   a display to display the webpage content;
   a user interface widget configured to initiate a rasterization of a complete version of the webpage content on a first tile buffer;
   a render widget compositor for identifying a limited set of webpage elements for rendering on the content display device as a limited, temporary version of the webpage content to display while a full, complete version of the webpage content is being rasterized for display on the content display device;
   a graphics processing unit configured to set an original tile pixel resolution of the limited set of webpage elements to be the same as a screen pixel resolution of the display on the content display device,
   a rasterizer configured to rasterize the limited set of webpage elements at a lower tile pixel resolution onto a second tile buffer to generate a rasterized version of the limited set of webpage elements, wherein the first tile buffer is different than the second tile buffer,
   a scale down component configured to scale down the original tile pixel resolution to the lower tile pixel resolution,
   a scale up component configured to scale up the rasterized version of the limited set of webpage elements rasterized at the lower tile pixel resolution to the screen pixel resolution of the display to generate a scaled-up-rasterized-version of the limited set of webpage elements; and
   a compositor configured to:
   temporarily composite the scaled-up-rasterized-version of the limited set of webpage elements onto an entire viewable area of the display before the rasterization of the complete version has finished while the rasterization of the complete version of the webpage content is occurring,
   waiting to composite, with the compositor of the content display device, the complete version of the webpage content onto the display until after rasterization of the complete version has finished, and
   display, after the rasterization of the complete version has finished, the complete version of the webpage content on the entire viewable area of the display to replace the temporary version of the webpage content.

8. The content display device of claim 7, wherein the user interface widget is:
   a dual WebView user interface widget and is used to rasterize and composite the limited set of webpage elements and the complete version of webpage content.

9. The content display device of claim 7, wherein the user interface widget further comprises a render widget compositor configured to distinguish between the limited set of webpage elements and the complete version of webpage content.

10. The content display device of claim 8, further comprising:
    a scripting language virtual machine configured to execute scripting language elements within a Full WebView portion of the dual WebView user interface widget.

11. The content display device of claim 7, further comprising:
    a layer tree configured to provide information regarding the scaling factor.

12. The content display device of claim 7, wherein the scaling factor is between 70 and 80 percent.

13. The content display device of claim 7, further comprising:
    a central processing unit configured to instruct the rasterizer not to rasterize webpage content that lies outside of an area that is not initially viewable in the display.

14. A non-transitory, tangible computer readable storage medium, encoded with processor readable instructions to perform a method for rendering webpage content on a content display device, the method comprising:
    initiating a rasterization with a user interface widget of the content display device, of a complete version of the webpage content on a first tile buffer;
    identifying, with a render widget compositor of the content display device, a limited set of webpage elements for rendering on the content display device as a limited, temporary version of the webpage content, to display while the complete version of the webpage content is being rasterized;
    setting, with a graphics processing unit of the content display device, an original tile pixel resolution of the limited set of webpage elements to be the same as a screen pixel resolution of a display on the content display device;

scaling down, with a scale down component of the content display device, the original tile pixel resolution of the limited set of webpage elements to a lower tile pixel resolution by a scaling factor;

rasterizing, with the rasterizer of the content display device, the limited set of webpage elements at the lower tile pixel resolution onto a second tile buffer to generate a rasterized version of the limited set of webpage elements, wherein the first tile buffer is different than the second tile buffer;

scaling up, with a scale up component of the content display device, the rasterized version of the limited set of webpage elements to generate a scaled-up-rasterized-version of the limited set of webpage elements;

compositing as the temporary version of the webpage content, with a compositor of the content display device before the rasterization of the complete version has finished, the scaled-up-rasterized-version of the limited set of webpage elements onto an entire viewable area of the display while the rasterization of the complete version of the webpage content is occurring;

waiting to composite, with the compositor of the content display device, the complete version of the webpage content onto the display until after rasterization of the complete version has finished; and displaying, after the rasterization of the complete version has finished, the complete version of the webpage content on the entire viewable area of the display to replace the temporary version of the webpage content.

15. The non-transitory, tangible computer readable storage medium of claim 14, wherein the limited set of webpage elements further excludes other particular webpage elements that have a higher resolution compared to other particular webpage elements that have a lower resolution.

16. The non-transitory, tangible computer readable storage medium of claim 14, wherein the limited set of webpage elements and the complete version of the webpage content are rasterized and composited using a dual WebView user interface widget.

17. The non-transitory, tangible computer readable storage medium of claim 14, wherein the scaling factor is applied to the original tile pixel resolution using information from a layer tree.

18. The non-transitory, tangible computer readable storage medium of claim 14, wherein the scaling factor is between 70 and 80 percent.

19. The non-transitory, tangible computer readable storage medium of claim 14, wherein the scaled-up-rasterized-version of the limited set of webpage elements represents all of the webpage content that is viewable at once in the display, and wherein a default setting instructs a rasterizer to rasterize additional webpage content that lies outside of an area that is initially viewable in the display, and the method further comprises;

changing the setting such that the rasterizer does not rasterize the additional webpage content.

20. A method for rendering webpage content on a content display device, the method comprising:

initiating a rasterization of a complete version of the webpage content on a first tile buffer;

identifying whether the webpage content comprises one or more dynamic scripting language elements;

rendering, when the webpage content comprises the one or more dynamic scripting language, a limited set of webpage elements, the limited set excluding the dynamic scripting language elements, for rendering on the content display device as a limited, temporary version of the webpage content, to display while the complete version of the webpage content is being rasterized for display on the content display device;

setting an original tile pixel resolution of the limited set of webpage elements to be the same as a screen pixel resolution of a display on the content display device;

scaling down the original tile pixel resolution of the limited set of webpage elements to a lower tile pixel resolution by a scaling factor;

rasterizing the limited set of webpage elements at the lower tile pixel resolution onto a second tile buffer to generate a rasterized version of the limited set of webpage elements, wherein the first tile buffer is different than the second tile buffer;

scaling up the rasterized version of the limited set of webpage elements to generate a scaled-up-rasterized-version of the limited set of webpage elements; and compositing as the temporary version of the webpage content, before the rasterization of the complete version has finished, the scaled-up-rasterized-version of the limited set of webpage elements onto an entire viewable area of the display while the rasterization of the complete version of the webpage content is occurring.

21. The method of claim 20, wherein the method further comprises:

waiting to composite the complete version of the webpage content onto the display until after rasterization of the complete version has finished.

22. The method of claim 21, wherein the method further comprises:

displaying, after the rasterization of the complete version has finished, the complete version of the webpage content on the entire viewable area of the display.

* * * * *